(12) United States Patent
Goodrich et al.

(10) Patent No.: US 7,312,254 B2
(45) Date of Patent: Dec. 25, 2007

(54) HIGH TEMPERATURE STABILIZATION OF UV SYSTEMS

(75) Inventors: James Goodrich, Phoenixville, PA (US); Jeffrey Allan Klang, West Chester, PA (US)

(73) Assignee: Sartomer Technology Company, Inc., Wilmington, DE (US)

( * ) Notice: Subject to any disclaimer, the term of this patent is extended or adjusted under 35 U.S.C. 154(b) by 391 days.

(21) Appl. No.: 10/923,170

(22) Filed: Aug. 20, 2004

(65) Prior Publication Data

US 2005/0043450 A1  Feb. 24, 2005

Related U.S. Application Data

(60) Provisional application No. 60/497,100, filed on Aug. 22, 2003.

(51) Int. Cl.
*C08K 5/13* (2006.01)
(52) U.S. Cl. ............... 522/74; 522/75; 522/76; 522/78; 522/79; 526/204; 526/220; 526/319
(58) Field of Classification Search ........ 526/204, 526/220, 319; 522/74–76, 78–79
See application file for complete search history.

(56) References Cited

U.S. PATENT DOCUMENTS

| | | | |
|---|---|---|---|
| 3,799,907 A * | 3/1974 | Hastings | 526/202 |
| 4,383,950 A | 5/1983 | Rasberger | |
| 4,540,738 A | 9/1985 | Zimmermann | |
| 4,929,660 A | 5/1990 | Chen | |
| 4,963,470 A * | 10/1990 | Klingert et al. | 430/281.1 |
| 5,290,888 A * | 3/1994 | Gatechair et al. | 526/83 |
| 5,814,714 A * | 9/1998 | Palomo et al. | 526/336 |
| 5,998,556 A * | 12/1999 | Kanto et al. | 526/262 |
| 6,441,071 B1 | 8/2002 | Van Nuffel | |
| 6,558,753 B1 * | 5/2003 | Ylitalo et al. | 427/466 |
| 6,730,763 B1 * | 5/2004 | Okazaki et al. | 526/262 |
| 6,936,672 B2 * | 8/2005 | Bell et al. | 526/281 |
| 2004/0081844 A1 * | 4/2004 | Bharti et al. | 428/523 |
| 2004/0210056 A1 * | 10/2004 | Wood et al. | 546/216 |

FOREIGN PATENT DOCUMENTS

| | | |
|---|---|---|
| EP | 0 995 180 | 11/1999 |
| JP | 7 268133 | 10/1995 |
| WO | WO 95/00579 | 1/1995 |

\* cited by examiner

*Primary Examiner*—Peter Szekely
(74) *Attorney, Agent, or Firm*—Michael B. Fein; Cozen O'Connor

(57) ABSTRACT

A composition comprising one or more radiation curable monomers and/or oligomers and one or heat stable composition comprising at least one radiation-curable alpha, beta-ethylenically unsaturated compound, at least one phenolic stabilizer, and at least one non-phenolic stabilizer selected from the group consisting of hydroperoxide decomposers and free radical traps. The compositions and methods are useful in applications such as radiation curable ink jet systems where viscosity is reduced by heating.

20 Claims, No Drawings

HIGH TEMPERATURE STABILIZATION OF UV SYSTEMS

CROSS REFERENCE TO RELATED APPLICATION

This application claims benefit of U.S. Provisional Patent Application 60/497,100 filed Aug. 22, 2003.

BACKGROUND OF THE INVENTION

This invention relates to the field of radiation curable compositions comprising ethylenically unsaturated monomers and/or oligomers.

Radiation curable compositions have well established utility in many applications, for example coatings, inks, adhesives, and electronic applications. Acrylic monomers and/or oligomers are commonly used for such compositions because they offer an attractive cost/performance balance for radiation curable applications. In such compositions (meth) acrylic monomers are used to reduce the viscosity of the radiation curable composition to an appropriate level for application to the substrate. In some cases where application of the radiation curable composition is done by spraying or jetting techniques that require very low viscosities, high levels of (meth)acrylic monomers are needed. High monomer levels can lead to poor cured film performance as well as cause emission of objectionable odors and problems with skin irritation. In such cases it would be desirable to heat the radiation curable composition to reduce its viscosity, but this can often lead to premature gellation because of the poor thermal stability of such compositions. In certain applications, for example radiation curable ink jet compositions, the state of the art radiation curable compositions suffer from instability at high temperatures. It is an object of the present invention to improve on the high temperature stability of radiation curable compositions comprising ethylenically unsaturated monomers and/or oligomers.

SUMMARY OF THE INVENTION

This object, and others which will become apparent from the following disclosure are achieved by the present invention which comprises in one aspect a heat stable radiation-curable composition comprising at least one radiation-curable alpha, beta-ethylenically unsaturated compound selected from monomers and/or oligomers and a stabilizer system comprising at least one phenolic stabilizer and at least one non-phenolic stabilizer selected from the group consisting of hydroperoxide decomposers and free radical traps. The stabilizer system is used in sufficient amount to increase the high temperature stability of the curable composition.

Such combinations of stabilizers are widely used as anti-oxidants in the extrusion and processing of thermoplastics such as polycarbonate, polyesters, polyolefins and PVC, but have not been previously described as stabilizers for radiation curable compositions. Such stabilizer systems have been discovered to prevent gelation of radiation curable monomer and oligomer compositions at high temperatures. This invention allows for energy-curable monomers and oligomers to be used at elevated temperatures where these materials have traditionally shown poor stability.

DETAILED DESCRIPTION OF THE INVENTION

The stabilizer system useful in the invention comprises one or more phenolic stabilizers and one or more non-phenolic stabilizers selected from hydroperoxide decomposers and free radical traps. The phenolic stabilizers can be one or more of hydroquinone, hydroquinone monomethylether, di-tert-butyl hydroquinone, and other substituted hydroquinone derivatives. Examples of such derivatives include octadecyl 3,5-di-t-butyl-4-hydroxyhydrocinnamate; ethylenbis(oxyethylene)bis-(3-(5-tert-butyl-4-hydroxytolyl)propionate; hexamethylenebis(3-(3,5-di-tert-butyl-4-hydroxyphenyl)propionate); 2,6-di-tert-butyl-4-(4,6-bis(octylthio)-1,3,5-triazin-2-ylamino)phenol; pentaerythritol tetrakis(3-(3,5-di-tert-butyl4-hydroxyphenyl)propionate);
thiodiethylene bis[3-(3,5-di-tert-butyl-4-hydroxyphenyl) propionate]; octadecyl-3-(3,5-di-tert-butyl-4-hydroxyphenyl)-propionate; 6,6'-di-tert-butyl-2,2'-thiodi-p-cresol; n,n'-hexane-1,6-diylbis(3-(3,5-di-tert-butyl-4 -hydroxyphenylpropionamide)); benzenepropanoic acid, 3,5-bis(1,1-dimethyl-ethyl)-4-hydroxy-c7-c9 branched alkyl esters; calcium diethyl bis(((3,5-bis(1,1-dimethylethyl)-4-hydroxyphenyl)methyl-phosphonate); 4,6-bis(octothiomethyl)-o-cresol; 2-(1,1-dimethylethyl)-6-[3-(1,1-dimethylethyl)-2-hydroxy-5-methylphenyl]methyl-4-methylphenyl acrylate; 1,3,5-tris(3,5-tri-tert-butyl-4-hydroxybenzyl)-1,3,5-triazine-2,4,6(1 h,3h,5h)-trione; (2,4,6-trioxo-1,3,5-triazine-1,3,5 (2h,4h,6h)-triyl)-triethylene tris(3-(3,5 -di-tert-butyl-4-hydroxyphenyl)propionate; and 1,3,5-tris(4-tert-butyl-3-hydroxy-2,6-dimethylbenzyl)-1,3,5-triazine-2,4,6(1h,3h, 5h)-trione. More particularly the phenolic stabilizers can be monophenols, di-phenols, tri-phenols or tetra-phenols.

The hydroperoxide decomposer can be, for example, a trivalent organophosphorus compound such as a phosphite or phosphonite.

Suitable phosphites are, triaryl, substituted triaryl, trialkyl, or mixed alkyl and aryl. Cyclic phosphites and di-, tri-, tetra-phosphites, and higher phosphites are also suitable. Specific examples of suitable phosphites include triphenylphosphite; tris(nonylphenyl)phosphite; tris(2,4-di-tert-butylphenyl) phosphite; bis(2,4-di-tert-butylphenyl)pentaerythritol diphosphite; bis(2,6-di-tert-butyl-4-methylphenyl)pentaerythritol diphosphite; bis(2,4-dicumylphenyl)pentaerythritol diphosphite; terakis(2,4-di-tert-butylphenyl) 4,4'-biphenylene-diphosphonite; bis[2,4-bis(1,1-dimethylethyl)-6-methylphenyl]ethyl ester; phosphoric acid; tetrakis(2,4-ditert-butylphenyl)[1,1-biphenyl]-4,4'-diylbisphosphonite; 2,2'methylenebis(4,6-di-tert-butyl-phenyl)octyl-phosphite; tris(2,4-ditert-butylphenyl) phosphite; diphenylphosphite; phenyldiisodecylphosphite, tetraphenyl dipropyleneglycol diphosphite; triisodecyl phosphite, trilauryl phosphite; and other similar phosphites.

Specific examples of suitable phosphonites include tetrakis(2,4-di-tert-butyl-phenyl) 4,4'-biphenylene-diphosphonite, bis[2,4-bis(1,1-dimethylethyl)-6-methylphenyl]ethyl ester; phosphoric acid; and tetrakis(2,4-ditert-butylphenyl) [1,1-biphenyl]-4,4'-diylbisphosphonite.

The said non-phenolic stabilizer can also comprise at least one free radical trap which can be a lactone or a hydroxylamine. The lactone is preferably a substituted benzofuranone. Specific lactone examples include 2(3H)-benzofuranone and 5,7-bis(1,1-dimethylethyl)-3-3(3,4-dimethylphenyl)lactone.

Suitable examples of hydroxylamines include diethylhydroxylamine; N,N-dibenzylhydroxylamine; N,N-dioctylhydroxylamine; N,N-dilaurylhydroxylamine, N,N-; didodecylhydroxylamine; N,N-ditetradecylhydroxylaamine; N,N-dihexadecylhydroxylamine; N,N-dioctadecylhydroxylamine; N-hexadecyl-N-tetradecylhydroxylamine; N-hexadecyl-N-heptadecylhydroxylamine; N-hexadecyl-N-octadecylhydroxylamine; N-heptadecyl-N-octadecylhydroxylamine; and N,N-di(hydrogenated tallow) hydroxylamine. More particularly the said non-phenolic stabilizer can comprise at least one lactone and at least one phosphate stabilizer.

The phenolics, lactones, and phosphites useful in the invention can be, for example, any of the type available from Ciba Specialty Chemicals under the trademarks Irgafos® and Irganox® and similar ones available from other companies.

A preferred lactone stabilizer is [2(3H)-benzofuranone, 5,7-bis-(1,1-dimethylethyl)-3-hydroxy-, reaction products with (o)-xylene] (under commercial name HP-136), a preferred phosphite stabilizer is [3,9-bis[2,4-bis(1,1-dimethylethyl)phenoxy]-2,4,8,-10 -tetraoxa-3,9-diphosphaspiro{5,5}undecane] (Irgafos® 126), and a preferred phenolic stabilizer is [tetrakis[methylene(3,5-di-(tert)-butyl-4-hydroxyhydrocinnamate)]methane] (Irganox® 1010). Blends of these three materials are available commercially under the Irganox® and Irgafos® trade names. Irganox® XP620 is 1 part HP-136, 2 parts Irgafos® 126, and 3 parts Irganox® 1010. Irgafos® XP60 is 1 part HP-136 and 2 parts Irgafos™ 126. Such commercially available blends are especially preferred.

The preferred stabilizers have excellent solubility and are thus easily incorporated into monomer and oligomers by blending. For example, the stabilizers can be dissolved in the radiation curable monomers and oligomers at 60° C. using an electric stirrer set for 500 rpm. The resulting blend of monomer and/or oligomer with the stabilizers shows no increase in haziness or viscosity once cooled.

Using alpha, beta ethylenically unsaturated energy-curable materials at high temperature is especially useful in ink jet applications. In ink jet applications the formulated product must have a low viscosity, typically 5-18 cps, in order to be jetted by most inkjet print heads. The ink jet inks made using the materials of the invention are radiation curable inks consisting of radiation curable monomers and/or oligomers, pigments, photoinitiators and additives such as dispersants, flow aids or wetting agents. Low viscosity can be achieved by either the incorporation of low viscosity materials or by using a formulation at higher temperatures. Low viscosity materials tend to have either one or two acrylate groups per molecule. Using an excessive amount of these materials will lead to formulations that require a lot of energy to cure and final films with poor physical properties. Using increased temperature as a method to decrease the viscosity can be achieved by heating the inkjet print heads. Higher functionality materials and more durable chemistries, such as urethane acrylates, can then be incorporated into the formulation. It is especially advantageous to have energy-curable formulations that are stable at elevated temperatures for a period of time without polymerizing.

In stabilizing energy-curable systems where acrylate functionality is present, it is important to control the radical species present in the material. Typically energy-curable materials contain a few parts-per-million (ppm) of hydroperoxides due to the raw materials and processing used. At elevated temperatures the rate of decay of materials to form peroxides is increased, leading to an increase in the overall concentration of peroxide. Other radical species, such as carbon centered, oxygen centered, and free radicals, may be present in the compositions due to a variety of chemical processes and impurities. The problem with many conventional prior art stabilizers is that they dramatically hinder the UV curing process by neutralizing the free-radical species generated by the photoinitiators. A balance needs to be achieved by the invention where the system is stabilized and will not prematurely cure, but will completely cure when initiated. A suitable weight ratio of the said stabilizer system with respect to the said radiation curable compounds, such as monomers and/or oligomer, ranges from 0.0001/100 to 10/90 and more preferably from 0.5/100 to 5/95.

The compositions of the invention are particularly suitable for use in radiation-urable ink jet compositions, further comprising pigments, photoiniatorss and additives such as dispersants, flow aids or wetting agents and the ink jet composition, having a viscosity at 100° C. of about 5-18 cps, but they may also be used in areas such as radiation curable coatings and adhesives were it may be desirable to apply the coating or adhesive by spraying. As is the case with radiation curable ink jet inks, coating or adhesive formulations that are made to have viscosity low enough to spray often have poor properties, strong odors or other undesirable characteristics. A higher viscosity formulation that can be heated to lower the viscosity and also has good stability is desirable for these applications.

Suitable radiation curable compounds used in the invention include materials selected from monomers and/or oligomers with at least one acrylate or methacrylate group per molecule, here-defined respectively as acrylates and/or methacrylates. The backbone chemistry of the radiation curable materials (monomers and oligomers) can vary and may include acrylated and/or methacrylated structures such as: polyesters, polyethers, urethanes, epoxies, polycarbonates, or acrylics.

Examples of such monomers are (meth)acrylate esters of branched or straight chain aliphatic alcohols such as iso-octanol; n-octanol; 2-ethylhexanol, iso-decanol; n-decanol; lauryl alcohol; tridecyl alcohol; cetyl alcohol; stearyl alcohol; 2-phenoxy ethanol; isoborneol; ethylene glycol; propylene glycol; 1,3 propane diol; 1,3 butane diol; 1,4 butane diol; 1,6 hexanediol; nonanediol; 1,4-cyclohexanedimethanol; tricyclodecanedimethano; neopentyl glycol; trimethylol propane; tris(hydroxyethyl)isocyanurate; pentaerythritol; di-trimethylolpropane; di-pentaerythritol; and alkoxylated derivatives of such alcohols and polyols; dipropylene glycol; tripropylene glycol and higher polypropylene glycols; diethylene glycol; triethylene glycol; tetraethylene glycol and higher polyethylene glycols; mixed ethylene/propylene glycols; and alkoxylated bis-phenol A derivatives.

Examples of such oligomers are epoxy (meth)acrylates such as those derived from bis-phenol A diglycidyl ether; 1,4-butanediol diglycidyl ether; or polypropylene glycol diglycidyl ether; urethane (meth)acrylates such as those derived from toluene diisocyanate; methylene diphenyl diisocyanate; hydrogenated methylene diphenyldiisocyante; isophorone diisocyanate or hexamethylene diisocyanate in combination with a polyester, polyether or polycarbonate polyol; hydroxy(meth)acrylate such as hydroxyethyl(meth) acrylate or polycaprolactone(meth)acrylate; and polyester acrylates derived from di or poly-hydroxy compounds and di or poly-carboxylic acid functional compounds.

The heat stability of the compositions of the present invention is significantly improved, with a stability (no gellation) of at least 30 days at 60° C. and more particularly of at least 30 days at 100° C.

Another subject of the present invention concerns a method of stabilizing a radiation-curable monomer and/or oligomer, the said method comprising the step of adding at least one stabilizer system as above-defined according the present invention to the said composition. More particular it concerns a method wherein the said stabilizer system comprises stabilizers selected from lactones, phosphates, and phenolics, in an amount sufficient to stabilize the radiation curable composition.

Another subject concerns a method of printing comprising the steps of heating a composition, as above-defined according to the present invention, in an ink jet print head so as to reduce the viscosity of the composition to about 5-18 cps, then applying the composition to a substrate, and finally radition curing the composition on the stbstrate/

The following non-limiting examples are presented to illustrate a few embodiments of the invention. All parts and percentages are by weight unless otherwise indicated.

EXAMPLES

Example 1

Preparation of a Stabilized Oligomer

A 1.0% blend of [2(3H)-benzofuranone, 5,7-bis-(1,1-dimethylethyl)-3-hydroxy-, reaction products with (o)-xylene], [3,9-bis[2,4-bis(1,1-dimethylethyl)phenoxy]-2,4,8,10 -tetraoxa-3,9-diphosphaspiro{5,5}undecane], [tetrakis [methylene(3,5-di-(tert)-butyl-4-hydroxyhydrocinnamate)] methane] (Irganox® XP620) in UV monomer was prepared as follows.

In this example stabilizer systems according to the invention were tested in 2 mole propoxylated neopentyl glycol diacrylate (Sartomer SR9003) for long-term stability at 100° C. and for any negative curing effects. Long-term stability was vastly improved over the same propoxylated neopentyl glycol diacrylate without the stabilizer system. Cure speed and real-time FTIR testing showed that the inhibitors had no negative effect on curing.

99.0 grams of the propoxylated neopentyl glycol diacrylate (Sartomer SR9003) were heated to 60° C. with 500 rpm of stirring. Once at 60° C., 1.0 gram of the Irgonox® XP620 stabilizer system was added and stirred until the blend was clear. Once cooled, the blend was clear with a viscosity of 10 cps.

Example 2

Stability Testing of Irganox® XP620 and Irgafos® XP60 in UV Monomer

Blends of the Irganox® XP620 or Irgafos® XP60 were made at 1.00%, 0.50%, 0.25%, and 0.10% concentration in propoxylated neopentyl glycol diacrylate using the method described in Example 1. Twenty (20) grams of each blend were put in a 100° C. oven in sealed brown glass jars. Stability was judged every 24 hours by visual inspection.

All of the blends that contained XP620 or XP60 stabilizer systems showed excellent stability against gellation exceeding 672 hours at 100° C. The propoxylated neopentyl glycol diacrylate (SR9003) without an added stabilizer gelled in less than 24 hours at 100° C.

Example 3

UV Inkjet Formula using Irganox® XP620 as a Stabilizer

An ink containing 44.25% propoxylated neopentyl glycol diacrylate, 35.00% Sartomer SR399LV (dipentaerythritol pentaacrylate), 8.00% Sartomer Sarcure® SR1135 (blend of 2,4,6-trimethylbenzoyldiphenyl phosphine oxide, 2,4,6-trimethylbenzophenone, 4-methylbenzophenone and oligo(2-hydroxy-2-methyl-1-(4-(-methylvinyl)phenyl)propanone), 7.00% Sartomer CN2279 (polyester acrylate), 5.00% Degussa Special Black® 250 (carbon black pigment), 0.50% Solsperse® 32000 (polymeric amide), and 0.25% Irganox® XP620 was made on a paint shaker with stainless steel shot. The ink had a particle size of less than 1 micron with a viscosity of 20 cps at 60° C. and a viscosity of 11 cps at 80° C.

Example 4

Comparative

Example 3 was repeated except the 0.25% Irganox® XP620 was replaced with 0.25% propoxylated neopentyl glycol diacrylate (SR9003).

Example 5

Comparison

Both inks were tested for thermal stability at 100° C. using the method described in Example 2. The first ink containing the Irganox® XP620 did not show any gel formation after 672 hours while the second ink without the stabilizer system completely gelled after 288 hours.

Example 6

Sprayable UV Coating using Irganox® XP620 as a Stabilizer

A blend of 36.80% Sartomer CN963 (aliphatic urethane acrylate), 34.50% Sartomer SR508 (dipropyleneglycol diacrylate), 15.00% Sartomer SR351 (trimethylolpropane triacrylate), 9.20% Sartomer SR238 (1,6-hexanediol diacrylate), 4.00% Sartomer Sarcure® SR1135 (blend of 2,4,6-trimethylbenzoyldiphenyl phosphine oxide, 2,4,6-trimethylbenzophenone, 4-methylbenzophenone and oligo (2-hydroxy-2-methyl-1-(4-(-methylvinyl)phenyl) propanone) and 0.50% Irganox® XP620 (see above) was blended with a mixer at 60° C. The coating was clear after blending, with a viscosity of 110 cps at 60° C. and a viscosity of 76 cps at 80° C. A second coating was blended that contained 0.50% Sartomer SR508 instead of 0.50% Irganox® XP620. Both coatings were tested for thermal stability at 100° C. using the method described in Example 2. The first coating containing the Irganox® XP620 did not show any gel formation after 1344 hours while the second coating without the stabilizers completely gelled after 621 hours.

While the invention has been described in detail and exemplified herein, various alternatives, modifications, and improvements should become readily apparent to those skilled in the art without departing from the spirit and scope of the invention

What is claimed is:

1. A heat stable radiation curable ink jet composition consisting of at least one radiation-curable alpha, beta-ethylenically unsaturated compound and a stabilizer system comprising at least one phenolic stabilizer and at least one non-phenolic stabilizer selected from the group consisting of hydroperoxide decomposers and free radical traps, pigment, photoinitiator, at least one additive selected from dispersant, flow, and wetting agent, the ink jet composition having a viscosity of about 5-18 cps at application temperature.

2. The composition of claim 1 wherein the radiation-curable compound is an acrylate or methacrylate.

3. The composition of claim 1 wherein the non-phenolic stabilizer comprises a hydroperoxide decomposer which is a trivalent organophosphorus compound.

4. The composition of claim 1 wherein the non-phenolic stabilizer comprises a hydroperoxide decomposer which is a trivalent phosphite or a phosphonite.

5. The composition of claim 1 wherein the non-phenolic stabilizer comprises a free radical trap which is a lactone or a hydroxylamine.

6. The composition of claim 1 wherein the stabilizer system comprises a hydroperoxide decomposer selected from the group consisting of tris(2,4-di-tert-butylphenyl) phosphite, bis(2,4-di-tert-butyl-phenyl) pentaerythritol-diphosphite; bis(2,6-di-tert-butyl-4-methylphenyl)pentaerythritol diphosphite; bis(2,4-dicumylphenyl)pentaerythritol diphosphite; terakis(2,4-di-tert-butyl-phenyl) 4,4'-biphenylene-diphosphonite; and 2,2'-methylenebis(4,6-di-tert-butyl-phenyl)octyl-phosphite.

7. The composition of claim 1 wherein the stabilizer system comprises a phenolic selected from the group consisting of monophenols; di-phenols; tri-phenols; and tetra-phenols.

8. The composition of claim 1 wherein the stabilizer comprises octadecyl-3,5-di-t-butyl-4-hydroxyhydrocinnamate.

9. The composition of claim 5 wherein the stabilizer system comprises a benzofuran-2-one.

10. The composition of claim 8 wherein the stabilizer system comprises 2(3H)-benzofuranone.

11. The composition of claim 1 wherein the non-phenolic stabilizer comprises a lactone and a phosphite.

12. The composition of claim 1 wherein the weight ratio of stabilizer system to monomer and/or oligomer is about 0.0001/100 to 10/90.

13. The composition of claim 1 wherein the weight ratio of stabilizer system to monomer and/or oligomer is about 0.5/100 to about 5/95.

14. The composition of claim 1 having polymerization stability at 60° C. for at least 30 days.

15. The composition of claim 1 having polymerization stability at 100° C. for at least 30 days.

16. The composition of claim 1 wherein the radiation curable compound is selected from the group consisting of (meth)acrylate esters of branched and straight chain aliphatic alcohols.

17. The composition of claim 1 wherein the radiation-curable compound selected from the group consisting of acrylate or methacrylate esters of iso-octanol, n-octanol, 2-ethylhexanol, iso-decanol, n-decanol, lauryl alcohol, tridecyl alcohol, cetyl alcohol, stearyl alcohol, 2-phenoxy ethanol, isoborneol; aliphatic diols selected from the group consisting of ethylene glycol, propylene glycol, 1,3 propane diol, 1,3 butane diol, 1,4 butane diol, 1,6 hexanediol, nonanediol, 1,4-cyclohexanedimethanol, tricyclodecanedimethanol, neopentyl glycol; triols selected from the group consisting of trimethylol propane, tris(hydroxyethyl) isocyanurate, pentaerythritol, di-trimethylol propane, di-pentaerythritol, dipropylene glycol, tripropylene glycol, polypropylene glycols, diethylene glycol, triethylene glycol, tetraethylene glycol, polyethylene glycols, mixed ethylene/propylene glycols, and alkoxylated bis-phenol A derivatives and alkoxylated derivatives thereof.

18. The composition of claim 1 wherein the radiation curable compound is selected from the group consisting of (A) epoxy (meth)acrylates of bis-phenol A diglycidyl ether; 1,4-butanediol diglycidyl ether, polypropylene glycol diglycidyl ether; or phenoxy glycidyl ether; (B) urethane (meth)acrylates which are the reaction product of an isocyanate selected from the group consisting of toluene diisocyanate, methylene diphenyl diisocyanate, hydrogenated methylene diphenyldiisocyante, isophorone diisocyanate, and hexamethylene diisocyanate with a polyester, polyether or polycarbonate polyol and a hydroxy(meth)acrylate; (C) polyester acrylates derived from di- or poly-hydroxy compounds, di- or poly-carboxylic acid functional compounds, or organic anhydrides.

19. The composition of claim 1 having a viscosity at 100° C. of about 5-18 cps.

20. A method of printing comprising heating a composition according to claim 1 in an ink jet print head so as to reduce the viscosity of the composition to about 5-18 cps, applying the composition to a substrate, and radiation curing the composition on the substrate.

* * * * *